United States Patent [19]

Bower

[11] Patent Number: 5,789,960
[45] Date of Patent: Aug. 4, 1998

[54] UNIVERSAL INPUT CIRCUIT INCLUDING OPTO-ISOLATOR AND RETRIGGERABLE MONOSTABLE MULTIVIBRATOR

[75] Inventor: Greg Bower, Ann Arbor, Mich.

[73] Assignee: Control Gaging, Inc., Ann Arbor, Mich.

[21] Appl. No.: 707,695

[22] Filed: Sep. 4, 1996

[51] Int. Cl.$^6$ ........................................ H03L 5/00
[52] U.S. Cl. ..................... 327/333; 327/319; 327/514
[58] Field of Search ................... 327/18, 20, 50, 327/58, 62, 64, 104, 306, 309, 319, 333, 514

[56] References Cited

U.S. PATENT DOCUMENTS

| | | | |
|---|---|---|---|
| 4,079,272 | 3/1978 | Howatt | 307/311 |
| 4,197,471 | 4/1980 | Lackey et al. | 307/311 |
| 4,292,551 | 9/1981 | Kolmann | 307/311 |
| 4,446,841 | 5/1984 | Van Siclen, Jr. | 327/319 |
| 4,507,571 | 3/1985 | Callan | 307/278 |
| 4,539,480 | 9/1985 | Artinano et al. | 250/551 |
| 4,739,174 | 4/1988 | Nagano | 327/333 |
| 5,068,545 | 11/1991 | Molnar | 327/514 |
| 5,111,070 | 5/1992 | Murphy et al. | 307/311 |
| 5,270,577 | 12/1993 | Yamaguchi et al. | 307/26 |
| 5,457,591 | 10/1995 | Mock et al. | 361/18 |

*Primary Examiner*—Timothy P. Callahan
*Assistant Examiner*—Jeffrey Zweizig
*Attorney, Agent, or Firm*—Harness, Dickey & Pierce, P.L.C.

[57] ABSTRACT

A universal input circuit which responds to a wider range of input voltages by eliminating the problem of heat dissipation in the input section of the circuit. The universal input circuit includes an input section and an output section connected by an opto-isolator for electrically isolating the input section from the output section. The input section of the universal input circuit is configured to turn on in response to an in-range DC input voltage activating the opto-isolator to produce a signal which drives the output section of the universal input circuit. A retriggerable, monostable, multivibrator is included in the output section of the universal input circuit which supplies an output in response to an in-range AC input voltage.

10 Claims, 2 Drawing Sheets

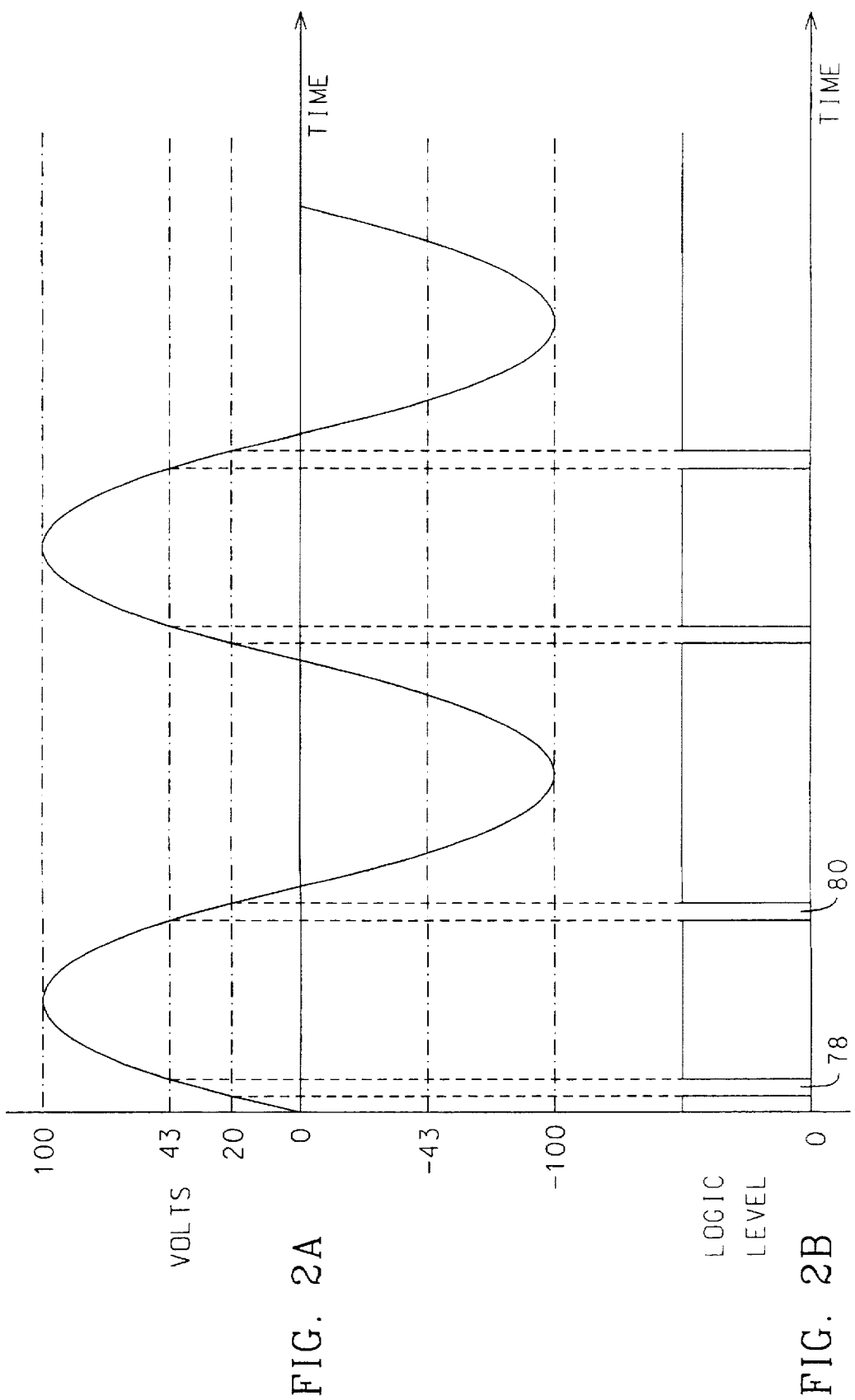

5,789,960

1

UNIVERSAL INPUT CIRCUIT INCLUDING OPTO-ISOLATOR AND RETRIGGERABLE MONOSTABLE MULTIVIBRATOR

BACKGROUND OF THE INVENTION

1. Field of the Invention

The present invention relates to input circuits designed to electrically isolate logic and circuitry from an input signal. More particularly, the present invention relates to a universal input circuit configured to handle a wide range of both direct and alternating current inputs.

2. Background Information

In systems which use control logic, it is often desirable to electrically isolate the control logic from the system's input signal. Typically, electrical isolation is accomplished by using an opto-isolator between the input circuitry and the control logic. An opto-isolator generally comprises a light-emitting diode (LED) and a photodiode. The LED converts the electrical input signal into a light signal which is received by the photodiode and used to drive the output circuit. In turn, the output circuit is configured to produce a signal for driving the control logic.

Presently available input circuits are usually designed for very specific applications so as to accept input signals having particular characteristics. For example, certain circuits are designed for accepting only AC signals, or for accepting only DC signals and, in general, such design is usually responsive only to signals of a particular relatively narrow range of amplitude levels. Therefore, not only are these circuits limited in their application, but it becomes necessary to determine ahead of time what input voltage will be applied in order to specify the proper input circuit.

Typically, in most prior art input circuits, the power (heat) dissipated by the input portion of the circuit is directly proportional to the applied voltage. This limits the input range of the circuit. In these prior art systems, an applied input voltage must be high enough to activate the opto-isolator, but not so high as to dissipate excess heat. This problem is made worse by the necessity of any such circuit to draw a certain minimum amount of current, even with its minimum specified input voltage applied, in order to prevent "false triggering" of the opto-isolator when driven by solid-state relays, due to the solid-state relays' off-state leakage currents.

Thus, there is a need for a universal input circuit which can handle a wide range of input voltages and which can be applied to a variety of different applications. There is also a need for a universal input circuit having an input portion with limited heat dissipation. There is a still further need for a universal input circuit which prevents "false triggering" of the opto-isolator due to the leakage current of some driving device.

SUMMARY OF THE INVENTION

The present invention comprises a universal input circuit having an input section and an output section connected by an opto-isolator. The input section is configured to handle a wide range of both direct current and alternating current input signals. A lower-limit resistor is included in the input section across the opto-isolator input to shunt any off-state leakage current from the driving device to circuit ground. The heat dissipation problem associated with prior art circuits is overcome by configuring the present universal input circuit to turn itself off whenever the applied input voltage is above the upper limit of a predetermined DC input voltage

2 range. This results in a series of spikes at the opto-isolator's output, when an in-range AC voltage is applied, causing a retriggerable, monostable, multivibrator in the output section to be triggered providing a steady output. The multivibrator's output is logically "OR-ed" with the opto-isolator's output so that the universal input circuit's overall output is active as long as either the opto-isolator's output (DC input voltage applied) or the multivibrator's output (AC input voltage applied) is continuously active.

Further objects, features and advantages of the invention will become apparent from a consideration of the following description and the appended claims when taken in connection with the accompanying drawings.

BRIEF DESCRIPTION OF THE DRAWINGS

FIG. 2A is a timing diagram showing an in-range AC input signal; and

FIG. 2B is a timing diagram showing the opto-isolator's output when the universal input circuit of the present invention is subjected to an in-range AC input signal.

DETAILED DESCRIPTION OF THE PREFERRED EMBODIMENT

Figure 1:
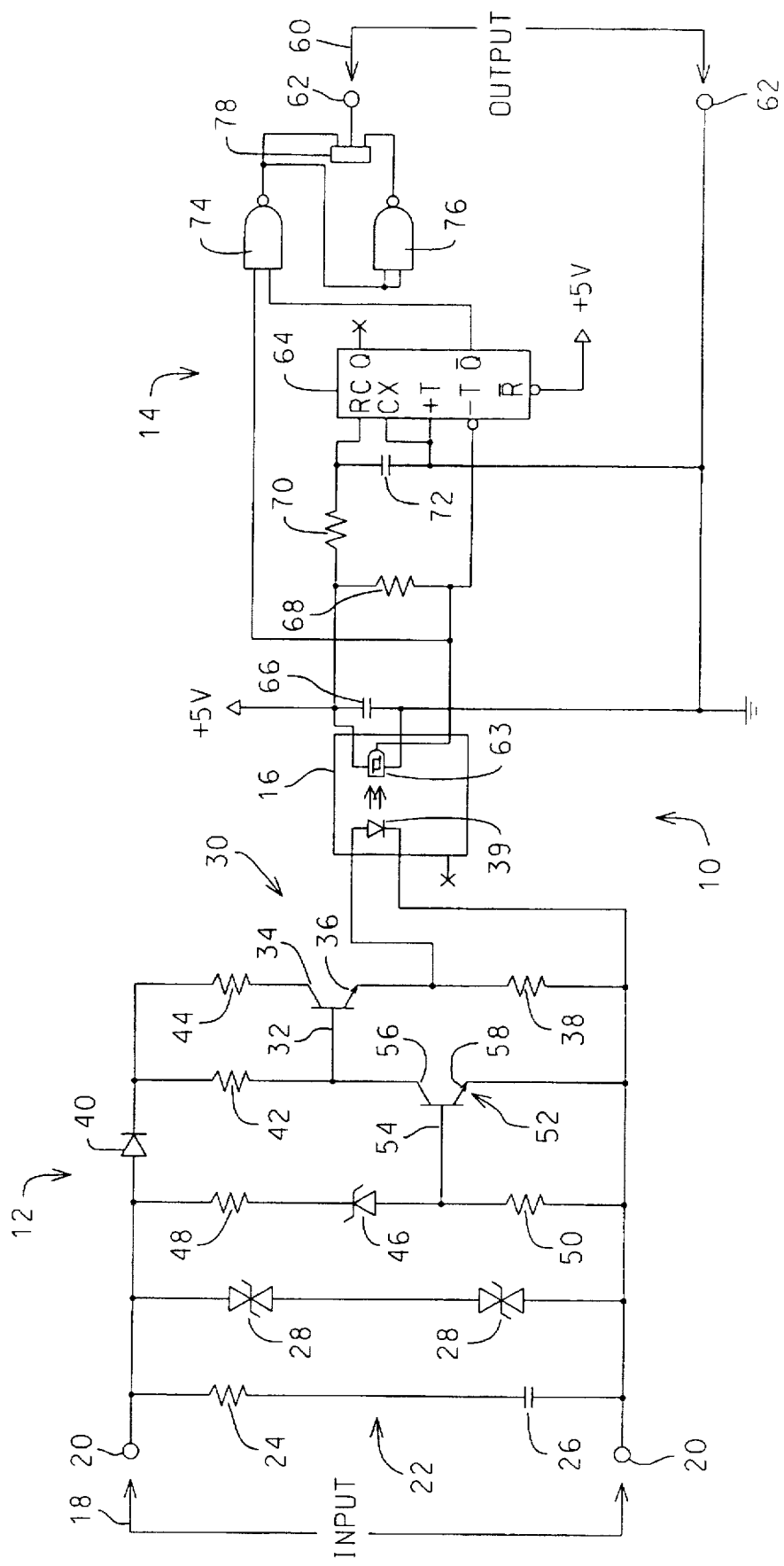
FIG. 1 is a schematic circuit diagram of the preferred embodiment of the universal input circuit of the present invention.

Preferred embodiments of the universal input circuit of the present invention are described herebelow with reference to the drawings.

Referring now to FIG. 1, the universal input circuit, generally designated 10, includes an input section 12 and an output section 14 connected by an opto-isolator 16. An input signal 18 is received into the input section 12 by a pair of input terminals 20. An RC input network 22 comprising a resistor 24 and capacitor 26 in series is connected across the input terminals 20 to prevent problems sometimes encountered when using the universal input circuit 10 with a solid-state AC output module.

When a solid-state AC output module is connected to the universal input circuit 10, a crude clamping circuit is formed consisting of the module's built-in snubber (itself a series RC network) and the ("rectifying") input section 12 of the universal input circuit 10. This can result in the AC input voltage supplied by the module having its positive peaks clamped to circuit-ground. Due to the "rectifying" nature of the universal input circuit 10 (it only conducts during positive half cycles of an AC input waveform) this can result in the universal input circuit 10 not detecting the input signal 18 and therefore not operating. RC input network 22 eliminates this problem. In the preferred embodiment, resistor 24 is configured as a 150KΩ resistor and capacitor 26 is a 0.047 µF capacitor. The values of resistor 24 and capacitor 26 were determined empirically by testing with a range of different types of AC output modules.

A pair of series surge suppressors 28 are connected across the input terminals 20 to protect the input section 12 of the universal input circuit 10 from over voltage spikes.

Transistor 30, having base 32, collector 34 and emitter 36, is configured to turn on whenever an in-range DC input voltage is applied to the input terminals 20. Lower-limit resistor 38, connected to emitter 36, is connected across the inputs of opto-isolator 16 to raise the threshold current at which opto-isolator 16 is activated. This helps prevent "false triggering" of opto-isolator 16 due to off-state leakage current of the driving device when the universal input circuit 10 is driven by solid state relays. Opto-isolator 16 will not be activated until the current through lower-limit resistor 38 produces enough voltage drop across lower-limit resistor 38 to forward-bias the opto-isolator's input LED 39. In the preferred embodiment, lower-limit resistor 38 is configured as a 39Ω resistor thus establishing approximately 20 volts DC as a lower-limit for the in-range DC input voltage which will activate opto-isolator 16.

Diode 40 is connected to an input terminal 20. Resistor 42 is connected between diode 40 and base 32. Resistor 44 is connected between diode 40 and collector 34. In the preferred embodiment, resistor 42 is a 47KΩ resistor and resistor 44 is a 560Ω resistor. The values of resistors 42 and 44 and the current gain of transistor 30 are chosen such that transistor 30 will be in saturation when an in-range DC input voltage is applied to the input terminals 20.

The zener voltage of zener diode 46 is used to define an upper-limit for the in-range DC input voltage. Zener diode 46 is configured to block current flow until the input signal voltage exceeds the zener voltage of zener diode 46. In the preferred embodiment, the zener voltage of zener diode 46 is chosen to be 43 volts. Resistor 48 is connected between diode 40 and zener diode 46. Resistor 50 is connected between zener diode 46 and circuit-ground and is used to shunt the zener diode's leakage current. In the preferred embodiment, resistor 48 is a 200KΩ resistor and resistor 50 is a 1MΩ resistor.

Transistor 52, having base 54, collector 56, and emitter 58 is configured to turn off transistor 30 when the input signal 18 exceeds the upper limit of the in-range DC input voltage. Base 54 of transistor 52 is connected to zener diode 46 and collector 56 of transistor 52 is connected to base 32 of transistor 30.

Output section 14 is driven by opto-isolator 16 and is configured to produce an output signal 60 at output terminals 62 in response to an in-range input signal 18. Capacitor 66 provides power supply bypassing for the output stage 63 of opto-isolator 16. Resistor 68 functions as a pull-up resistor for the output of the opto-isolator 16, which is an open collector type output. Retriggerable, monostable, multivibrator 64 is connected to output Schmitt trigger logic buffer 63 of opto-isolator 16. Retriggerable, monostable, multivibrator 64 is configured to respond to a negative edge trigger signal, from opto-isolator 16, and to respond with a negative pulse at its output. Resistor 70 and capacitor 72 are connected to the RC input of multivibrator 64 and are used to establish the output pulse duration of multivibrator 64. NAND gate 74 functions as a negative logic OR gate whose output will go high whenever either of its inputs is low, i.e., whenever either the output of opto-isolator 16 or the output of monostable multivibrator 64 is low (or both). NAND gate 76 functions as an inverter, and provides an output of polarity opposite to that provided by NAND gate 74. Header 78 provides for the selection of either the true output from NAND gate 74 when header 78 pins 1 and 2 are shorted or the inverted output from NAND gate 76, when header 78 pins 2 and 3 are shorted.

In operation, when an in-range DC input voltage is applied to input terminals 20, diode 40 will conduct. Because the zener voltage of zener diode 46 defines the upper-limit of the DC input voltage range, zener diode 46 will not conduct except for a small leakage current which is shunted to circuit-ground by resistor 50. Therefore, no current flows into base 54 of transistor 52, which will remain off. Since transistor 52 remains off, current will flow through resistor 42 into base 32 of transistor 30, turning transistor 30 on. Current will also flow through resistor 44 into collector 34 of transistor 30, out emitter 36 and through the parallel combination of lower-limit resistor 38 and the input of opto-isolator 16. For an in-range DC input voltage, lower limit resistor 38 produces enough voltage drop to forward-bias the optoisolator's input LED 39, activating optoisolator 16. When opto-isolator 16 is activated, it's output goes from logic high to logic low, causing the output of NAND gate 74 to go from logic low to logic high. At the nominal DC input voltage of 24 volts, the universal input circuit 10 dissipates about 1.5 watts of power.

When an in-range AC input voltage is applied to input terminals 20, the universal input circuit 10 assumes different states during different portions of the AC waveform. When input voltage 18 is negative, diode 40 is reversed-biased and no current flows through input section 12 of universal input circuit 10 (nor is any power dissipated). As shown in FIGS. 2A and 2B, as the input voltage crosses zero and becomes positive, when it reaches the lower-limit of the in-range DC input voltage range (approximately 20 volts), opto-isolator 16 is activated as described earlier for DC input voltages. As the input voltage continues to rise, when it reaches the upper-limit of the DC input voltage range (approximately 43 volts), zener diode 46 begins to conduct, current flows into base 54 of transistor 52, turning transistor 52 on, and transistor 52 pulls base 32 of transistor 30 nearly to ground, turning transistor 30 off. This deactivates opto-isolator 16, which remains deactivated until the input voltage falls back down below the upper-limit of the DC input voltage range. Opto-isolator 16 is then re-activated until the input voltage falls below the lower-limit of the DC input voltage range. This results in two negative spikes 78 and 80 at the opto-isolator's output for each positive half-cycle of the AC input waveform. Spikes 78 and 80 trigger multivibrator 64, whose output pulse duration is longer than the longest time between spikes for 50/60 Hz inputs. When triggered, the multivibrator's output goes from logic high to logic low in which state it will remain continuously as long as an in-range AC input voltage is applied to input terminals 20. This is due to its retriggerability and the presence of triggering spikes at its input which recur at intervals shorter than its output pulse duration. The multivibrator's low output causes the output of NAND gate 74 to go from logic low to logic high. Note that for in-range AC input signals whose peak voltage does not exceed the upper limit of the DC input voltage range, there will be only one spike, not two; however, the circuit will still function as described above, because the monostable's pulse duration is set longer than the interval between the negative edges of these spikes for 50/60 Hz input signals. Note also that the worst case turn-on response (time from input signal being applied to output changing state) is approximately 20 milliseconds (one cycle of a 50 Hz input signal) and the worst case turn-off response (time from input signal being removed to output changing state) is approximately 25 milliseconds (the monostable's pulse duration in the preferred embodiment).

Since the universal input circuit 10 is off for all input voltages above the upper-limit of the DC input voltage range, excessive current flow is eliminated and power dissipation is minimized. Total average power dissipation with a 230 volt AC input signal applied is about the same as for 24 volts DC (approximately 1.5 watts). The power dissipation can be even lower for lower voltage AC input signals. All input components are specified so as to enable the circuit to withstand peaks up to 400 volts, which may be encountered during the circuit's off state with 230 VAC applied to input terminals 20. Furthermore, surge suppressors 28 are included to protect input section 12 of universal input circuit 10 from voltage spikes which could exceed 400 volts.

In the preferred embodiment, the above-described universal input circuit 10 is assembled on a standard printed circuit board using through-hole components. As is most likely, multiple universal input circuits 10 can be assembled on a single printed circuit board. Furthermore, it is also contemplated to provide a single input circuit in a module (with industry standard dimensions and pinout) using either the through-hole or surface-mount versions of the circuit components.

It is to be understood that the invention is not limited to the exact construction illustrated and described above, but that various changes and modifications may be made without departing from the spirit and scope of the invention as defined in the following claims.

I claim:

1. A circuit for detecting the presence of an input signal and for providing an output signal based on the detected input signal which is electrically isolated from the input signal, said circuit comprising:

input circuit means for detecting the input signal;

output circuit means for producing the output signal, said output circuit means further comprising a retriggerable, monostable, multivibrator having an input and an output; and an opto-isolator having an input and an output, said opto-isolator input connected to said input circuit means and said opto-isolator output connected to said output circuit means, thus connecting and electrically isolating said input circuit means from said output circuit means;

wherein said input circuit means is configured to activate said opto-isolator coupling said input circuit means and said output circuit means when the input signal is within a predetermined range and deactivate said opto-isolator decoupling said input circuit means and said output circuit means when the input signal is outside of said predetermined range; and wherein said opto-isolator is configured to produce an output in response to a direct current input signal within said predetermined range thus driving said output circuit means to produce the output signal and said opto-isolator is configured to produce output spikes in response to an alternating current input signal within said predetermined range thus triggering said multivibrator to drive said output circuit means to produce the output signal.

2. The circuit of claim 1 further comprising switching means for producing the output signal based on said opto-isolator output and said multivibrator output.

3. The circuit of claim 1 further comprising a lower-limit resistor connected across said opto-isolator input, said lower-limit resistor being configured to set a lower limit to said predetermined range by setting a minimum amount of current needed to activate said opto-isolator.

4. The circuit of claim 3 further comprising:

a first transistor having a base, a collector and an emitter, said first transistor base and collector being connected to said circuit input means and said first transistor emitter being connected to said lower-limit resistor;

a zener diode connected across said circuit input means, said zener diode having a zener voltage defining an upper limit to said predetermined range; and a second transistor having a base, a collector and an emitter, said second transistor base connected to said zener diode and said second transistor collector connected to said first transistor base;

wherein said zener diode is configured to block current flow to said second transistor base when the input signal voltage is below said upper limit set by said zener voltage thus allowing said current flow into said first transistor base turning said first transistor on causing said first transistor to supply current to opto-isolator and to said lower-limit resistor; and wherein said zener diode is configured to conduct current to said second transistor base when the input signal voltage is above said upper limit set by said zener diode voltage turning said second transistor on, causing said first transistor base to be pulled nearly to ground thus shutting said first transistor off, blocking current flow through said lower-limit resistor, and deactivating said opto-isolator.

5. The circuit of claim 1 wherein said multivibrator has a timeout which is greater than the amount of time between said opto-isolator output spikes.

6. The circuit of claim 1 wherein said predetermined range is approximately 20 volts to 43 volts.

7. The circuit of claim 1 further comprising first and second surge protecting diodes connected in series across said circuit input means for protecting said circuit from input signal high voltage peaks.

8. The circuit of claim 1 further comprising a resistor and a capacitor connected in series across said circuit input means for preventing input signal positive alternating current peaks from being clamped to zero.

9. The circuit of claim 1 wherein said input circuit means, said output circuit means, said opto-isolator and said multivibrator are connected and arranged on a printed circuit board.

10. The circuit of claim 1 wherein said circuit is configured to produce an output signal corresponding to input signals within the range of approximately 20 to 43 volts direct current and approximately 24 to 240 volts alternating current.

* * * * *